United States Patent [19]

Piekos

[11] Patent Number: 5,161,471
[45] Date of Patent: Nov. 10, 1992

[54] APPARATUS FOR REBURNING ASH MATERIAL OF A PREVIOUSLY BURNED PRIMARY FUEL

[75] Inventor: Stanley J. Piekos, Holden, Mass.

[73] Assignee: Riley Stoker Corporation, Worcester, Mass.

[21] Appl. No.: 791,902

[22] Filed: Nov. 13, 1991

[51] Int. Cl.$^5$ .............................................. F23J 1/00
[52] U.S. Cl. ................................ 110/165 R; 110/245; 110/259; 110/190
[58] Field of Search ............... 110/259, 165 R, 165 A, 110/245, 188, 190

[56] References Cited

U.S. PATENT DOCUMENTS

| | | |
|---|---|---|
| 3,432,247 | 3/1969 | Sander . |
| 3,507,256 | 4/1970 | Sander . |
| 3,508,506 | 4/1970 | Bishop .......................... 110/165 R |
| 4,233,914 | 11/1980 | Schuette et al. . |
| 4,266,901 | 5/1981 | Schuette . |
| 4,330,502 | 5/1982 | Engstrom ...................... 110/245 X |
| 4,438,705 | 3/1984 | Basic, Sr. . |
| 4,516,510 | 5/1985 | Basic, Sr. . |
| 4,656,971 | 4/1987 | Eaton et al. .................. 110/245 X |
| 4,836,772 | 6/1989 | LaRue . |
| 4,915,619 | 4/1990 | LaRue . |
| 4,960,380 | 10/1990 | Cheetham . |
| 4,970,970 | 11/1990 | Avery . |

Primary Examiner—Edward G. Favors
Attorney, Agent, or Firm—Mason, Kolehmainen, Rathburn & Wyss

[57] ABSTRACT

Apparatus for reburning ash material of a previously burned primary fuel includes a reburn combustion vessel having an inlet for receiving ash material from a primary combustion unit such as a boiler or furnace and an outlet for discharging the products of combustion from the vessel produced from burning the ash material. The outlet of the ash reburn vessel is connected to the primary combustion unit at an elevated height above the firing level. A floor is provided in the ash reburn vessel for supporting a discrete bubbling bed of burning ash material and the floor includes a plurality of spaced apart openings distributed relatively uniformly over substantially all of the area of the floor. Combustion air is introduced into the reburn vessel at a relatively low velocity to provide a source of underfire combustion air for the bubbling bed. Combustion air is also introduced at an upper level in the vessel above the bubbling bed to provide an overfire source of combustion for the upwardly moving unburned components of ash material carried along with the products of combustion rising out of the bubbling bed.

18 Claims, 8 Drawing Sheets

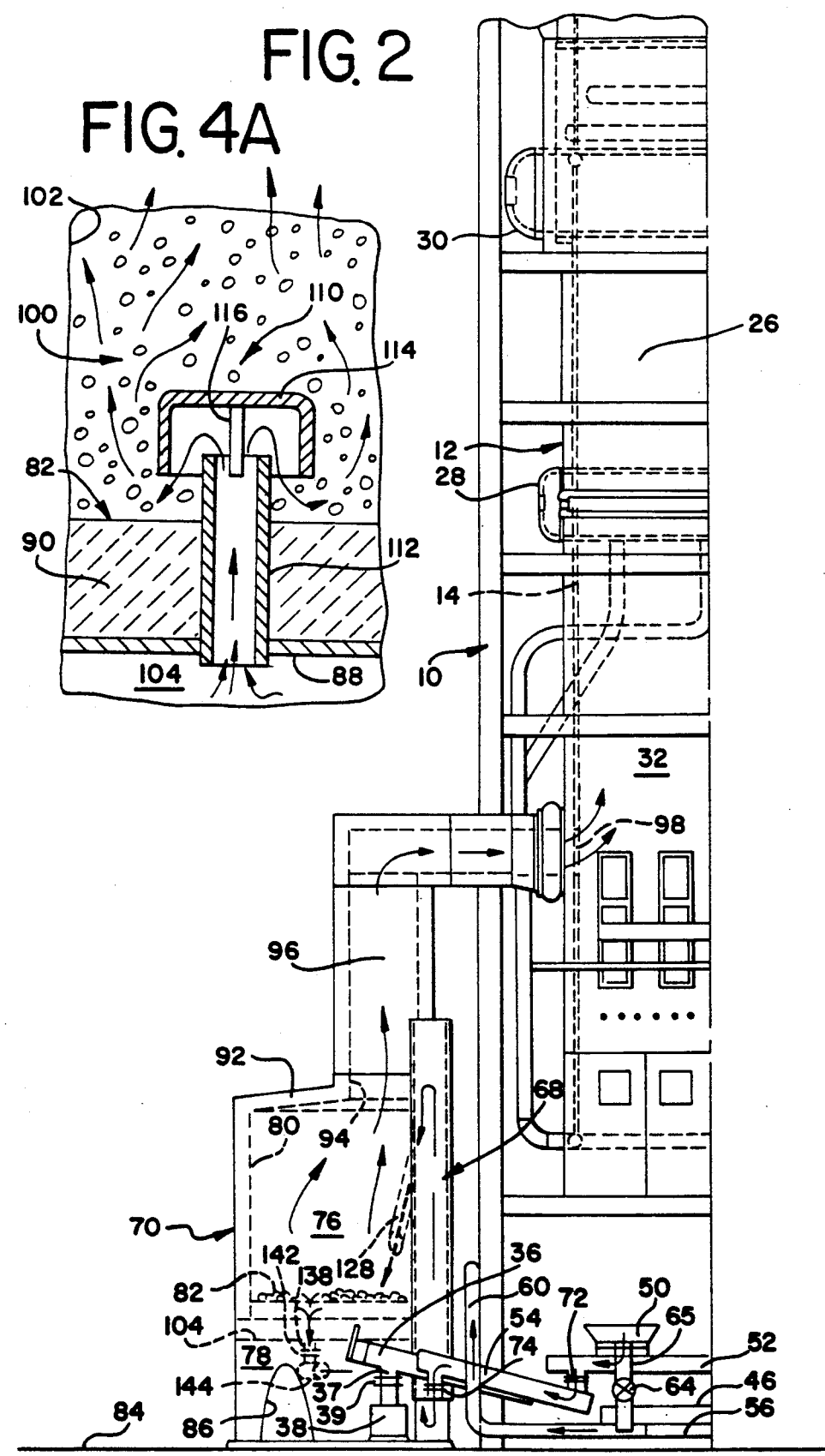

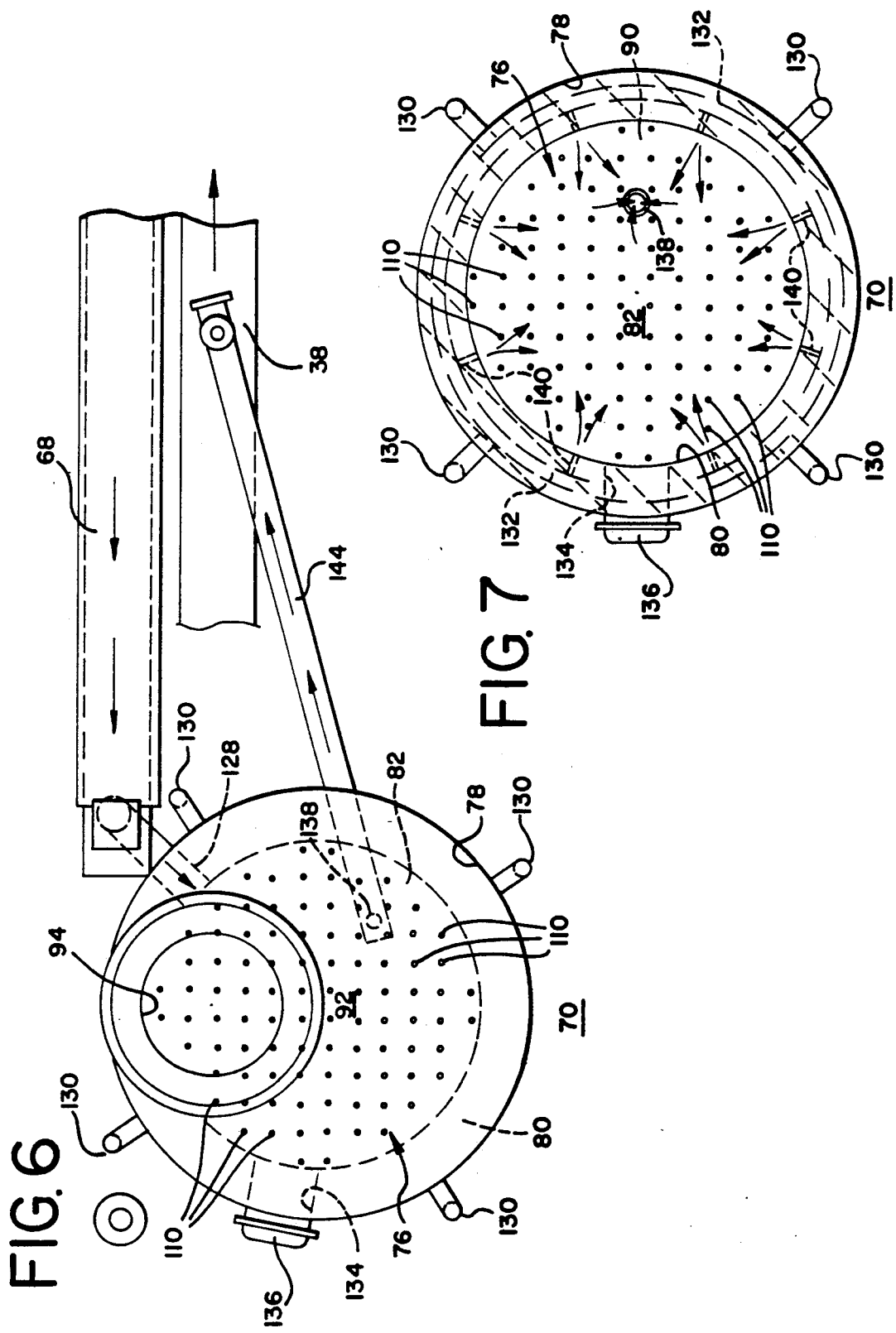

APPARATUS FOR REBURNING ASH MATERIAL OF A PREVIOUSLY BURNED PRIMARY FUEL

BACKGROUND OF THE INVENTION

1. Field of the Invention

The present invention relates to a new and improved apparatus for reburning ash material of a previously burned primary fuel. More particularly, the reburning apparatus is especially adapted for use in a parallel combustion path with a primary combustion unit such as that used in the lumbering industry where the primary fuel is waste wood products. Burning of waste wood products generally produces a relatively high percentage or volume of ash material and, a portion of this ash material is usually not completely combusted leaving unburned carbon and other unoxidized constituents which can provide additional heat energy if burned efficiently. Because of the high volume of ash material produced in the primary combustion process it is desirable to further oxidize or reburn the ash material available from the primary combustion unit so that the amount of total boiler ash is minimized and thus available landfill capacity for the boiler ash is not overburdened with excessive volume.

2. Background of the Prior Art

Previous attempts to more efficiently burn available fuel such as waste wood products so that all of the carbon content is efficiently oxidized and a lower volume of ash material is obtained have not met with great success because of a number of factors such as highly variable flow rates, relatively little transit time to obtain more complete combustion and disruption of the fuel burning process in a primary combustion unit when attempts at reinjecting burned ash material into the process have been utilized.

U.S. Pat. No. 3,432,247 discloses a boiler for heating combustible fluids provided with a bottom drain pipe.

U.S. Pat. No. 3,507,256 discloses a fourth circulation boiler system with a separate boiler and furnace unit and including a bypass duct from the furnace to a smokestack which, under certain circumstances, can be utilized in the event of equipment failures.

U.S. Pat. No. 4,233,914 discloses a pressurized waste wood furnace system wherein combustion gases are recirculated and intermixed with hot combustion gases.

U.S. Pat. No. 4,266,901 discloses a storage bin having a driven agitator useful for handling dense, stringy fuel, particularly when frozen or partially frozen.

U.S. Pat. Nos. 4,438,705 and 4,516,510 disclose an incinerator having a plurality of reburning stages to provide additional heat recovery.

U.S. Pat. Nos. 4,836,772 and 915,619 disclose a burner for use with coal, oil or gas as a fuel designed to reduce the amount of nitrogen oxides produced.

U.S. Pat. No. 4,960,380 discloses a method and apparatus for the reduction of solid waste material wherein coherent radiation is used to provide the energy, excitation and sustenance of plasma in which the solid waste materials are reduced to a slag-like material.

U.S. Pat. No. 4,970,970 discloses a drying and burning incinerator for trash and solid waste to minimize pollutants exhausted into the atmosphere.

OBJECTS OF THE PRESENT INVENTION

It is an object of the present invention to provide a new and improved reburn apparatus for reburning ash material received from a primary combustion unit and more particularly, it is an object of the invention to provide a new and improved reburn apparatus which is especially adapted for use in a parallel combustion path with a primary combustion unit of the type such as that used in the lumbering industry, for example, wherein the primary fuel comprises waste wood products.

Another object of the present invention is to provide a new and improved ash reburning apparatus for use with a primary combustion unit burning waste wood products and the like.

Still another object of the present invention is to provide a new and improved reburning system which obtains additional heat energy from the reburning ash material and which is effective to minimize the total volume of boiler ash that must be disposed of in landfills and the like.

Still another object of the present invention is to provide a new and improved reburning system for ash material of a previously burned primary fuel wherein control of the reburning process in a parallel combustion loop with the primary combustion unit is substantially automatic and requires a minimum of control input variables.

Still another object of the present invention is to provide a new and improved ash reburning unit or vessel of the character described wherein a low velocity bubbling bed of burning ash material is utilized to increase transit time of the ash material being reburned so as to effectively obtain most of the available energy or heat value from the unburned content of the material entering the vessel and to minimize the amount of total boiler ash that must be disposed of eventually.

Yet another object of the present invention is to provide a new and improved apparatus for reburning ash material of the previously burned primary fuel wherein a reburn vessel includes a sensing system for measuring the temperature of products of combustion and for measuring the height of a bubbling bed and using the measurements for controlling underfire and overfire air supplied.

Still another object of the present invention is to provide a new and improved ash reburn vessel wherein a discrete bubbling bed of burning ash material is provided with underfire air moving upwardly through bubble caps and in addition includes a plurality of overfire air injection passages at a level above the discrete bubbling bed of burning ash material.

BRIEF SUMMARY OF THE PRESENT INVENTION

The foregoing and other objects and advantages of the present invention are accomplished in a new and improved apparatus for reburning ash material of a previously burned primary fuel. The apparatus includes a reburn combustion vessel having an inlet for receiving ash material from the primary combustion unit such as a boiler or furnace unit that is fired with waste wood products. The reburn vessel includes an outlet for discharging the products of combustion into a combustion chamber of the primary combustion unit at a level wherein minimum disturbance of the combustion process in the primary combustion unit occurs. The reburned ash material moves in a combustion path or loop that is in parallel with a portion of the combustion path of the main or primary fuel in the primary combustion unit. A floor is provided in the ash reburn vessel for supporting a discrete bubbling bed of burning ash material and the floor includes a plurality of spaced apart openings distributed relatively uniformly over substantially the entire area of the floor. Combustion air is introduced into the reburn vessel at a relatively low velocity to provide a source of underfire combustion air for maintaining the bubbling bed. Secondary or overfire combustion air is also introduced into the reburn vessel at an upper level above the bubbling bed t provide overfire air for combustion of the upwardly moving unburned components leaving the lower bubbling bed. A control system is provided for sensing the temperature of the products of combustion at an elevated level and for sensing the height of the discrete bubbling bed of burning ash material above the floor. The sensed information is used for controlling the flow of combustion air into the reburn vessel.

BRIEF DESCRIPTION OF THE DRAWINGS

For a better understanding of the present invention, reference should be had to the following detailed description taken in conjunction with the drawings, in which:

FIG. 2 is a fragmentary, back side elevational view of the primary combustion unit and reburn vessel looking in a direction at right angles to that of FIG. 1;

FIG. 4A is an enlarged vertical cross-sectional view of a bubble cap assembly taken substantially along lines 4A—4A of FIG. 4;

FIG. 6 is an enlarged top plan view of the reburn vessel looking downwardly from the level of line 6—6 of FIG. 1A;

FIG. 7 is a horizontal cross-sectional view taken substantially along line 7—7 of FIG. 4.

DETAILED DESCRIPTION OF A PREFERRED EMBODIMENT OF THE INVENTION

Referring now more particularly to the drawings, therein is illustrated a typical, relatively large, upstanding primary combustion unit 10 of a type designed to utilize waste wood products and other types of fuels as a primary fuel.

The primary combustion unit 10 includes an upstanding water wall combustion chamber 12 having pairs of opposed side walls 14 and 16 for containing an upward flow of burning products of combustion. The primary combustion unit 10 is especially designed for burning fuels such as waste wood products which accumulate in lumbering regions at various lumber mills and lumber processing sites. These types of fuels are relatively high in energy content but are somewhat difficult to burn efficiently because of relatively high moisture content and relatively high volumes of ash material that are produced. It has been a problem to provide for the disposal of furnace ash from combustion units such as the primary combustion unit 10 and because of the high volumes of ash material produced, large landfill areas have been required. A system that is capable of reducing the percentage or volume of ash generated and obtaining a full or more complete burning of the available carbon and hydrogen in waste wood products is a desirable end to reduce pollution both from a landfill standpoint and from a stack gas emission standpoint.

Figure 1:
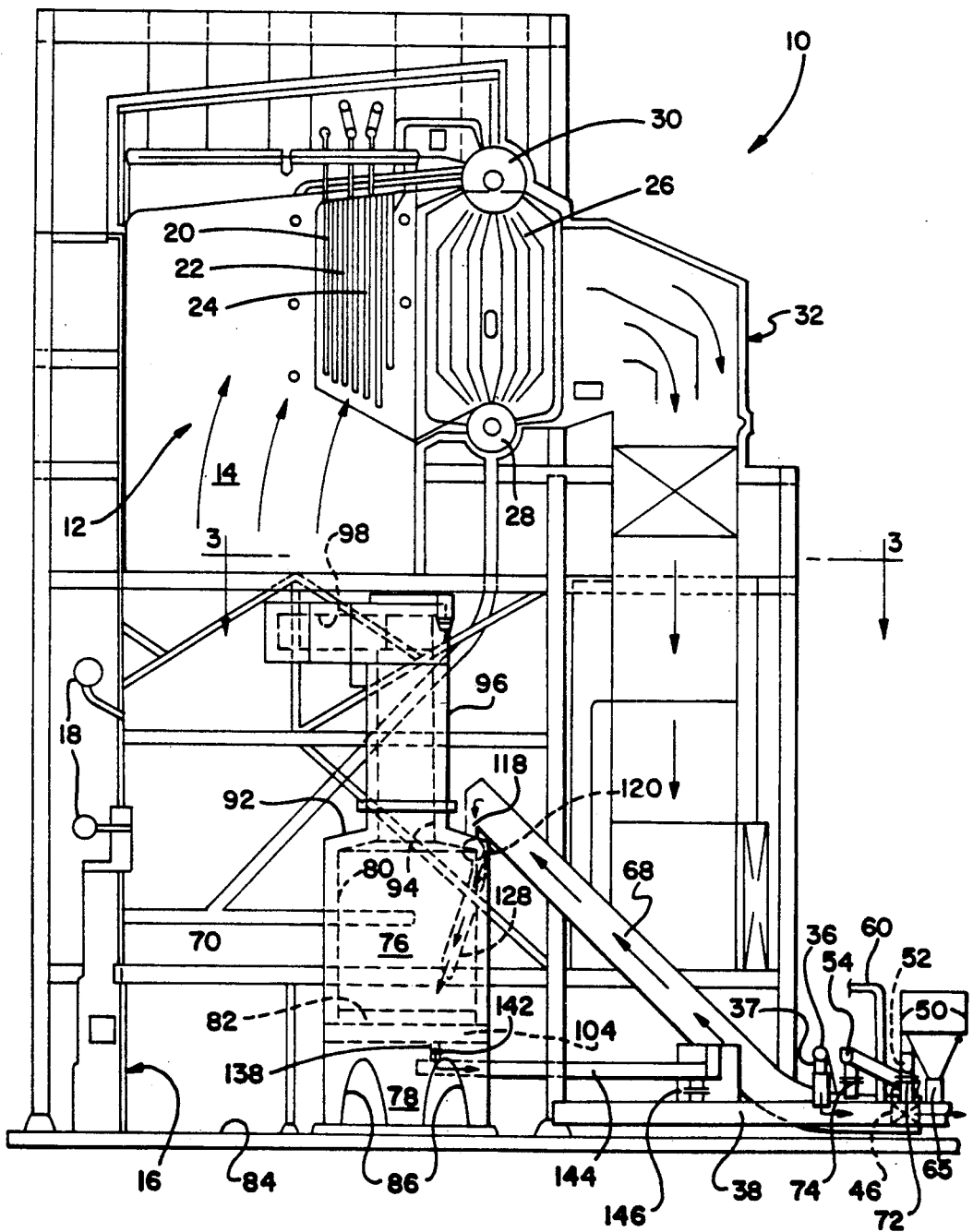
FIG. 1 is a side elevational view of a primary combustion unit in combination with a reburn vessel constructed in accordance with the features of the present invention.

Typically, a primary combustion unit includes a lower level stoker and grate 16 and one or more upper levels of secondary air injection as typified by the upper air ducts 18 as illustrated in FIG. 1. During operation hot ashes and cinders are produced and eventually taken from the lower stoker firing unit and these materials must be properly disposed of in a manner consistent with ecological requirements mandated by the EPA and other organizations.

Typically, a primary combustion unit 10 for burning waste wood products includes a bank of tubes at an upper level comprising a superheater 20, a reheater 22 and economizer 24. The hot products of combustion pass over these tube banks giving up heat and move through a main bank of boiler tubes 26 (FIG. 1) extending between a lower water drum 28 and upper steam drum 30 before passing out and downwardly into a downcomer housing 32 wherein additional heat is extracted from the products of combustion and separation of unburned particles and ash is achieved.

Typically, a primary combustion unit 10 may include an air pre-heater, ash collection hopper 34 for collecting ash material from the air pre-heater section. An air pre-heater ash discharge conveyor 36 is provided for transferring ash material from the hopper 34 directly to an existing ash collection conveyor 38 provided for directing the refuse ash material from various collection points in the system to an ash disposal station 40 as shown in FIG. 8.

Typically, the primary combustion unit 10 may include a plurality of precipitator hoppers 42 associated with an electrostatic precipitators and collected ash materials from these hoppers are discharged by a precipitator ash conveyor 44 into the existing ash collecting conveyor 38.

Figure 8:
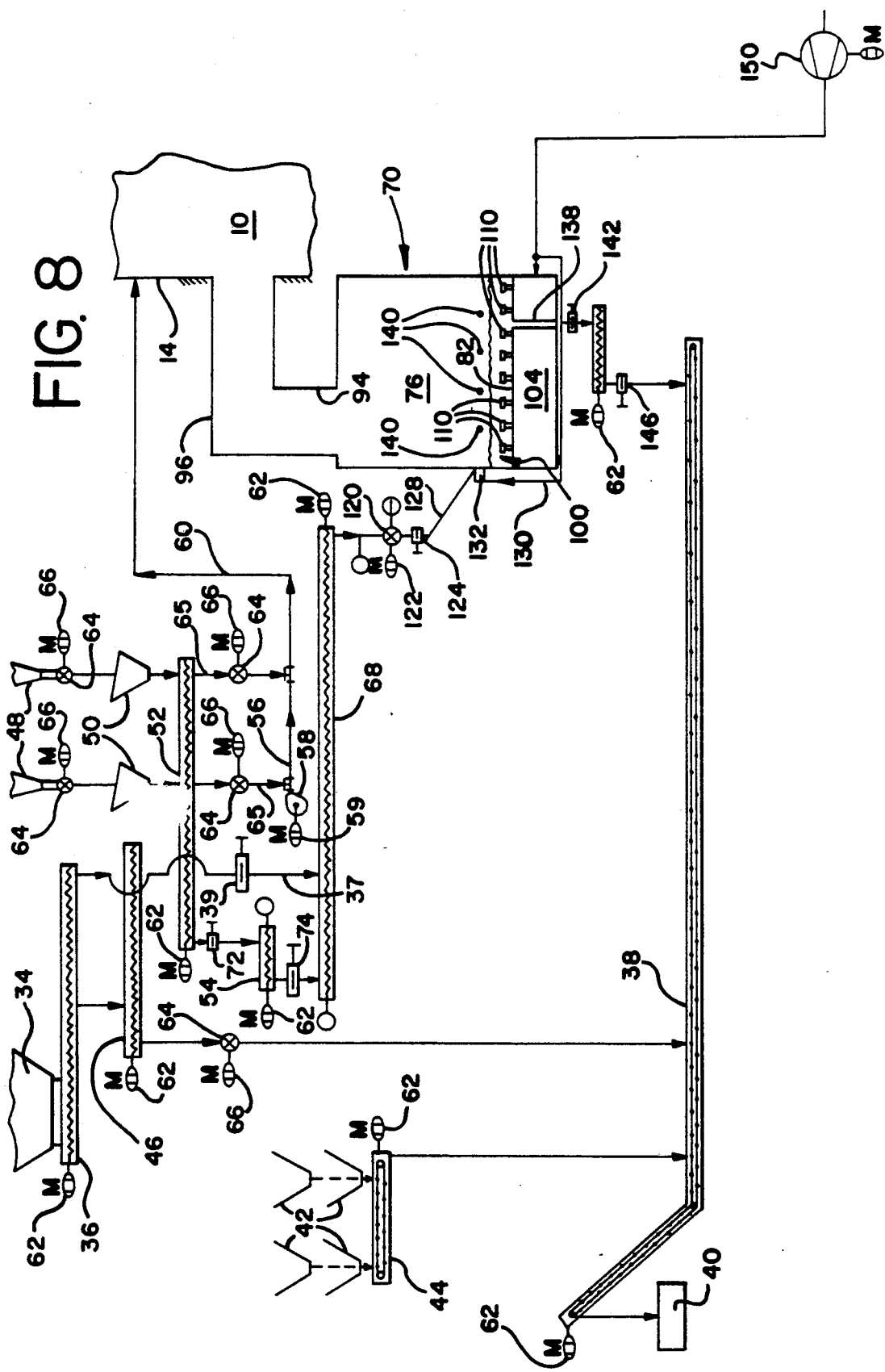
FIG. 8 is a schematic diagram illustrating a typical ash material handling system but modified in accordance with the present invention.

As illustrated in FIG. 8, the air pre-heater discharge conveyor 36 may direct a portion of the ash material from the air pre-heater collection hopper 34 into an existing dust collection conveyor 46 which, in turn, directs a portion of its discharge into the existing ash collecting conveyor 38. The primary combustion unit 10 includes a dust collecting system employing one or more ash separators 48 which feed into ash collection or sand separation hoppers 50. The hoppers 50 feed ash material into a dust collector system ash conveyor 52 and output from the conveyer 52 is directed into an upsloping ash transfer conveyor 54. Cinders are separated out in the sand separator 50 via feeder ducts 65 and rotary feeders 64 from the material reaching the dust collector and are directed into a plenum chamber 56 pressurized by an air blower 58 (FIG. 8) for retaining the cinders via a cinder injection line 60 into the combustion chamber 12 of the primary combustion unit 10.

Figure 1A:
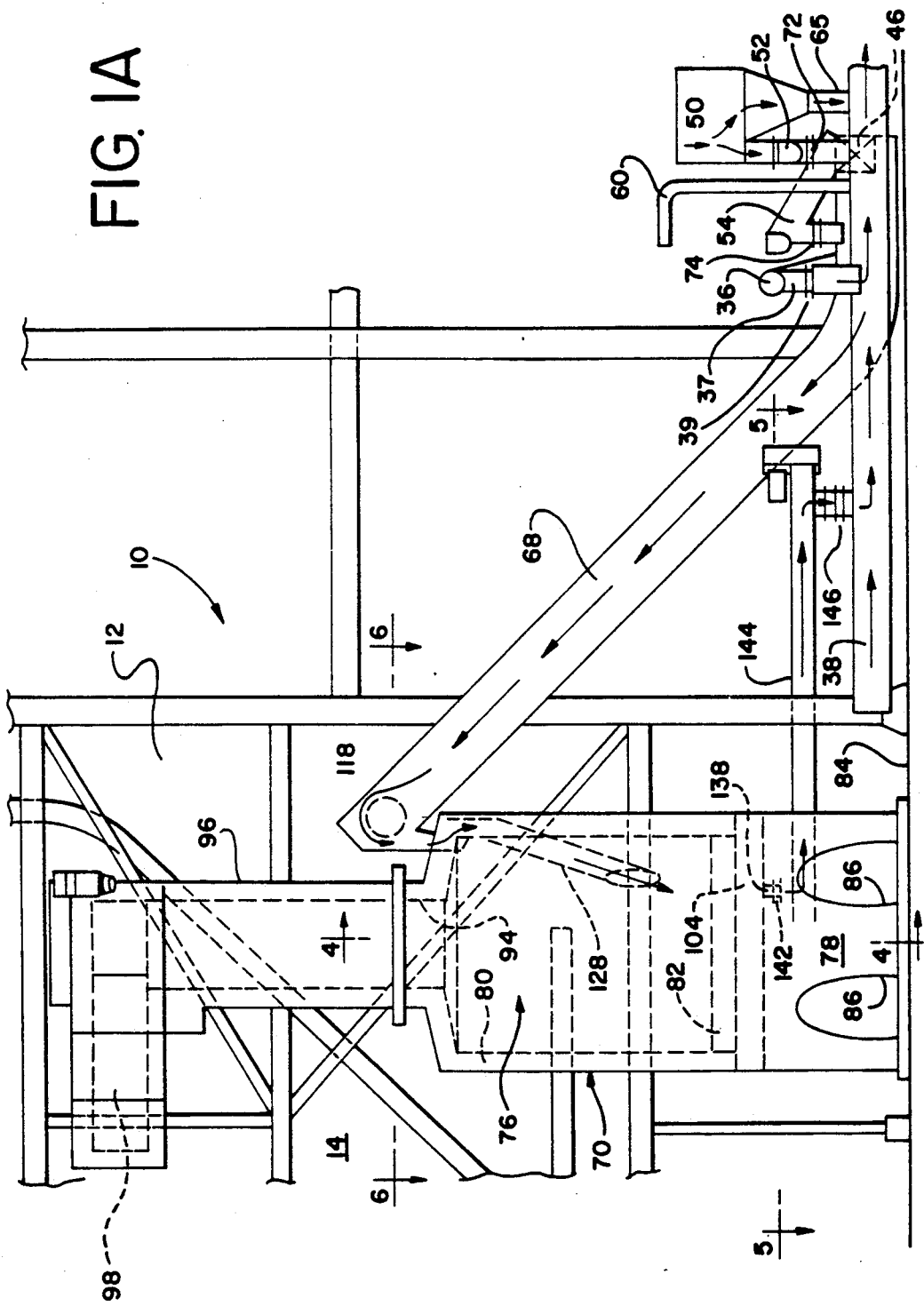
FIG. 1A is an enlarged elevational view of a lower portion of FIG. 1.

Referring to FIG. 8, the various screw and belt conveyors therein illustrated are preferably driven by electric gear motor units 62. Rotary feeders 64 driven by electric gear motors 66 are provided for controlling the flow of ash material from the existing dust collector conveyor 46 to the collection conveyor 38 and for controlling the flow of ash material from the separators 48 to the sand separators 50 feeding the screw conveyor 52. Similarly, rotary feeders 64 driven by motor 66 are provided in discharge lines 65 from the dust collector ash conveyor 52 directed to the plenum chamber 56 of the cinder injection system powered by the air blower 58 which is driven by a blower motor 59. Ash material from the air pre-heater discharge conveyor 36 is directed via a discharge line 37 having a slide gate 39 therein into a lower end portion of a main feed conveyor 68 having an upwardly sloping forward end portion (FIGS. 1 and 1A) and adapted to provide a flow of ash material to a new and improved ash reburn vessel 70 constructed in accordance with the present invention.

Ash material from the sand separators 50 is also supplied to the main feed conveyor 68 via the dust collector ash conveyor 52 which discharges a flow of ash material through a slide gate 72 into the inlet end of the ash transfer conveyor 54. The conveyor 54 feeds into the lower end portion of the main feed conveyor 68 via a discharge chute controlled by means of another slide gate 74.

When sufficient ash material is not available for efficiently operating the ash reburn vessel 70, the slide gates 39 and 74 may be closed and all of the ash material from the air pre-heater hopper 34 may be delivered directly to the collection conveyor 38 via the conveyors 36, 46 and rotary feeder 64 as shown in FIG. 8. The feed gates 64 in respective feeder ducts 65 between the dust collector ash conveyor 52 and the cinder plenum chamber 56 may be operated so that the available ash material collected in the separators 48 may be disposed of by reinjection into the primary combustion unit 10 through the cinder injection line 60.

In accordance with the present invention, the ash reburn vessel 70 includes an upstanding cylindrical combustion chamber 76 having a steel outer shell 78 and lined with refractory material 80 on the inside to withstand the elevated temperatures involved. A circular floor structure 82 is provided at a level spaced above ground level 84 or other structure on which the ash reburn vessel 70 is supported so that an open space is provided beneath the floor structure 82 to accommodate other components of the system as described hereinafter. Access to the space between the ground level 84 and the circular floor structure 82 is provided through a plurality of larger openings 86 formed in the steel outer shell 78 as best shown in FIG. 4.

The floor structure 82 includes a circular steel plate 88 above which is provided a layer of refractory material 90 similar to that used on the refractory liner wall 80 inside the outer shell 78. The combustion chamber 76 is closed at the top by a frustoconically shaped top wall 92 also level with refractory material and provided with an eccentric outlet opening 94. Hot products of combustion generated in the ash reburn vessel 70 flow upwardly from the combustion chamber 76 through the outlet opening 94 in the top wall 92 which is connected via a refractory lined, duct or breaching system 96 having an outlet at the upper end connected to a port 98 provided in the side wall 14 of the primary combustion unit 10. The port 98 in the wall 14 is positioned at a level approximately the same as that of secondary air input to the combustion chamber 12. The injection of hot products of combustion from the ash reburn vessel 70, through the wall port 98 on a back wall 14 of the primary combustion chamber 12 has a minimal effect or disturbance on the combustion process taking place in the primary combustion unit 10.

Figure 4:
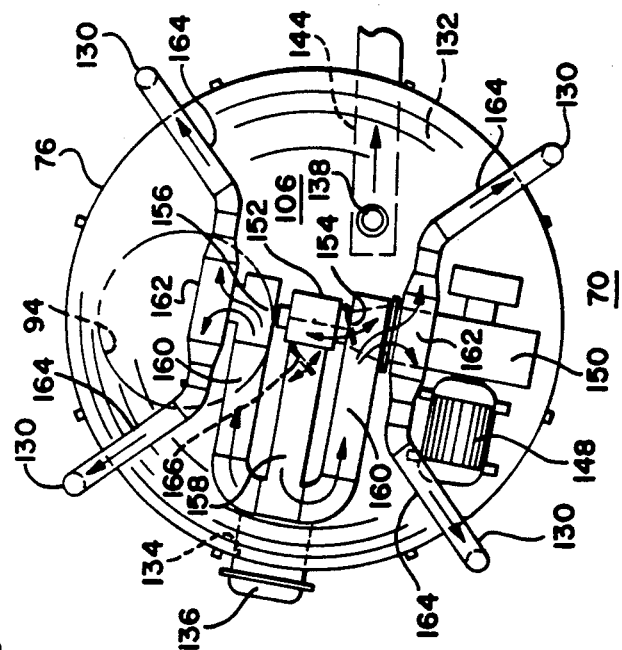
FIG. 4 is a vertical cross-sectional view of the reburn vessel in accordance with the features of the present invention taken substantially along line 4—4, but omitting portions of the combustion air supply and control system for use with the reburn vessel.

In accordance with the present invention, ash material received into the ash reburn vessel 70 from the main feed conveyor 68 is burned in a low velocity bubbling bed of burning ash material 100 having a discrete upper level 102 (FIGS. 4 and 4A). The ash material is provided with a source of underfire combustion air from a larger cylindrical plenum chamber 104 located directly beneath the steel plate floor 88 as best shown in FIG. 4. The plenum chamber 104 is closed at the lower end by a circular bottom wall 106 formed of steel and the parallel, steel walls 88 and 106 thus define the upper and lower limits of the plenum chamber 104. These walls are structurally interconnected by a grid structure consisting of a plurality of vertically disposed uniformly spaced apart rods 108.

Underfire combustion air from the plenum chamber 104 is injected upwardly into the bubbling bed of burning ash material 100 at a relatively low velocity through a plurality of uniformly spaced apart bubble cap assemblies 110 (FIG. 4A). As best shown in FIGS. 6 and 7 the bubble cap assemblies 110 are uniformly spaced apart over substantially the entire area of the circular floor structure 82.

Figure 2A:
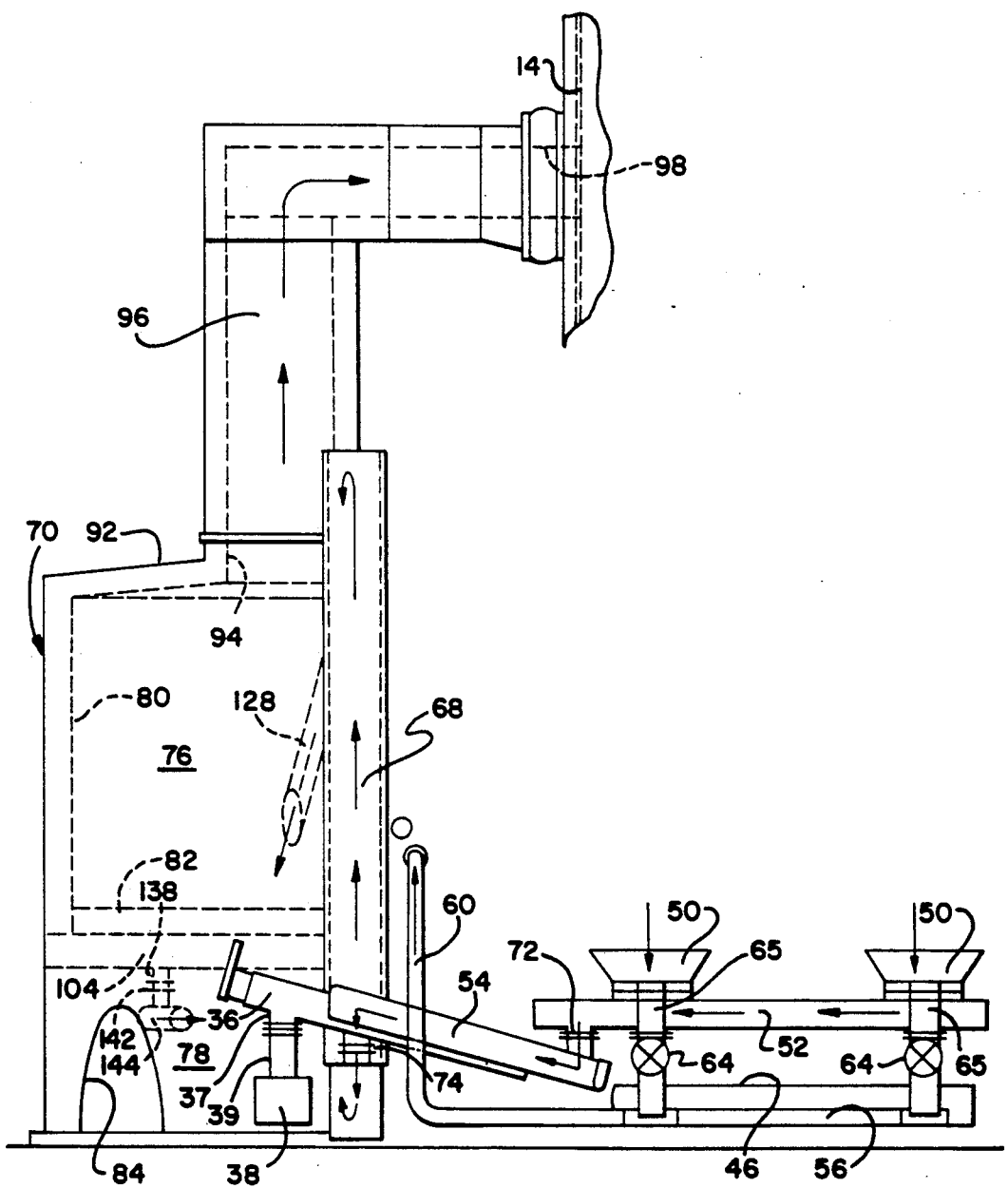
FIG. 2A is an enlarged fragmentary view of a lower portion of FIG. 2.
Figure 3:
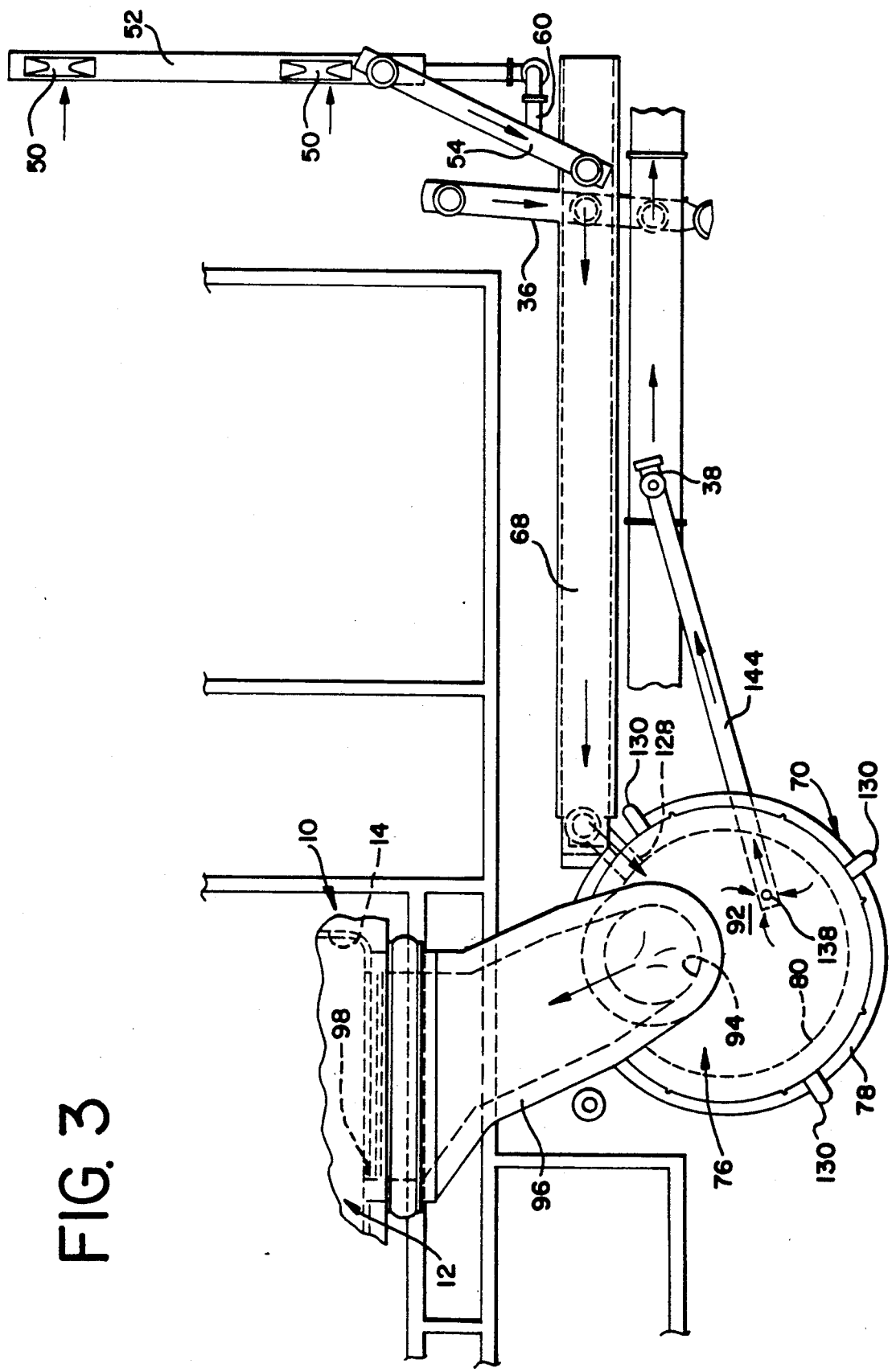
FIG. 3 is a fragmentary top plan view looking downwardly substantially from the level of line 3—3 of FIG. 1.

Each bubble cap assembly 110 includes an upstanding, central air nozzle or conduit 112 open at both ends and having an upper outlet end spaced above the level of refractory material 90 in the floor structure 82 as shown in FIG. 2. The open lower end of the air nozzle or conduit 112 projects down to or slightly below the underside of the circular steel plate floor 88 in order to receive a flow of underfire combustion air from the plenum chamber 104. Each bubble cap assembly 110 includes a cup-shaped bubble cap 114 in concentric alignment with the central fluid conduit 112 and supported therefrom by a plurality of legs 116 so that a circular top wall of the bubble cap 114 is spaced above the upper end of the central fluid conduit or nozzle 112 to permit a flow of air from the central conduit out into the bubbling bed 100 whenever the plenum chamber 104 is supplied with combustion air under pressure.

As illustrated in FIG. 4A, the cap 114 includes a circular top wall in coaxial alignment with the upper open end of the central conduit 112 and has an integral, downwardly depending cylindrical skirt. The skirt has a lower edge spaced below the level of the upper, open end of the central conduit 112 and this arrangement prevents ash material from passing into the upper open end of the central conduit 112 should the plenum chamber 104 become depressurized. Moreover, the cap 114 deflects the incoming air at relatively low velocity to flow down and out and under the lower edge of the skirt of the cap 116 into the bed of ash material. This underfire air begins the oxidation process of the hot unburned carbon and other fuel elements available in the ash material in the bubbling bed 100. Bubbles of air/gas are formed around each of the bubble cap assemblies 110 and move upwardly through the bed of burning ash material 100. The upper level 102 of the bubbling bed of ash material may extend twenty inches or so above the upper level of the refractory material 90 of the floor structure 82.

In accordance with the present invention, ash material from the upper end of the main feed conveyor 68 flows downwardly through a discharge chute 118 (FIG. 4) connected to the upper end of a rotary feeder 120 driven by a motor 122 (FIG. 8). The rotary feeder 120 provides a more uniform flow rate of ash material into the ash reburn vessel 70 and also provides an airlock or seal preventing the outflow of burning ash material and hot products of combustion into the conveyor 68 and other components of the ash collection system.

A manual slide gate 124 is provided at the outlet of the rotary feeder 120 and the slide gate can be shut or closed when the ash reburn vessel 70 is not in use. Ash material from the rotary feeder 120 is directed downwardly via a discharge chute 126 into a steeply sloping inlet chute 128 that is water cooled to prevent overheating. The inlet chute 128 comprises a pair of concentric steel tubes forming an outer water jacket therebetween and the chute is open at its lower end to direct the incoming flow of ash material directly onto the bubbling bed of burning ash material 100. Cool water is introduced into the lower end of the inlet chute 128 through a Water line 127 and flows out the upper end through an outlet water line 129. Combustible components contained in the ash material delivered through the inlet chute 128 into the ash reburn vessel 70 begin to ignite and burn upon reaching a general area above the turbulent bubbling bed 100. Some of the heavier ash materials fall downwardly to form an active layer of material comprising the bubbling bed 100.

In accordance with the present invention, additional combustion air or overfire air is supplied to the region immediately above the upper level 102 of the bubbling bed 100 through a plurality of equilaterally spaced apart supply ducts 130 having outlet ends connected to openings in the steel shell 78 and pressurizing an internal arcuate plenum chamber 132 (FIG. 4) formed in the lining material 80 and extending almost completely around the circumference of the combustion chamber 76 except for a short section or segment of the circumference that is occupied by an inspection port or opening 134 (FIGS. 6 and 7). The inspection port 134 is normally closed off by a metal door 136 secured in place to a flange and lined with a refractory material on the inner surface.

Secondary or overfire combustion air supplied to the wall plenum 132 from the ducts 130 is directed radially inwardly towards the center of the combustion chamber 76 through a plurality of radial wall ports 140 spaced equilaterally around the interior wall surface of refractory material 80 at a level somewhat above the discrete upper level 102 of the bubbling bed 100. Because of the relatively low velocity of underfire combustion air and reduced volume of ash flow in comparison to the primary fuel flow in the main or primary combustion unit 10, transit time of the ash material moving through the reburn vessel 70 is greatly increased over that in the primary combustion unit 10. Because of the increased transit time, a more complete combustion or oxidation of any remaining combustibles contained in the ash material is achieved to derive additional heat energy which is then passed on to the main combustion chamber 12 of the primary combustion unit 10 for pick up and collection in the various water tubes and steam tubes in the primary combustion unit.

The secondary or overfire combustion air injection passages 140 direct a flow of oxygen rich air to more completely oxidize or burn the upwardly moving burning ash materials in the combustion chamber 76 of the ash reburn vessel 70. In order to maintain the discrete upper level 102 of the bubbling bed of burning ash material 100 at a desirable optimum level, the ash reburn vessel 70 is provided with a hot ash drain conduit 138 located in the floor structure 82 as illustrated best in FIGS. 4, 5 and 8. A manual slide gate 142 is provided to close off flow through the drain conduit 138 when desired. At the lower end, the conduit 138 discharges into a water cooled screw conveyor 144 driven by a motor 62. Material discharged from the water cooled screw conveyor 144 passes onto the existing collector conveyor 38 and a slide gate 146 is provided for shutting off discharge from the water cooled screw conveyor 144 when desired. The drain conduit 138 and conveyor 144 thus maintain the level of the bubbling bed of burning ash material 100 at a desired height above the floor structure 82 as the ash reburning process takes place within the combustion chamber 76 of the ash reburn vessel 70.

Figure 5:
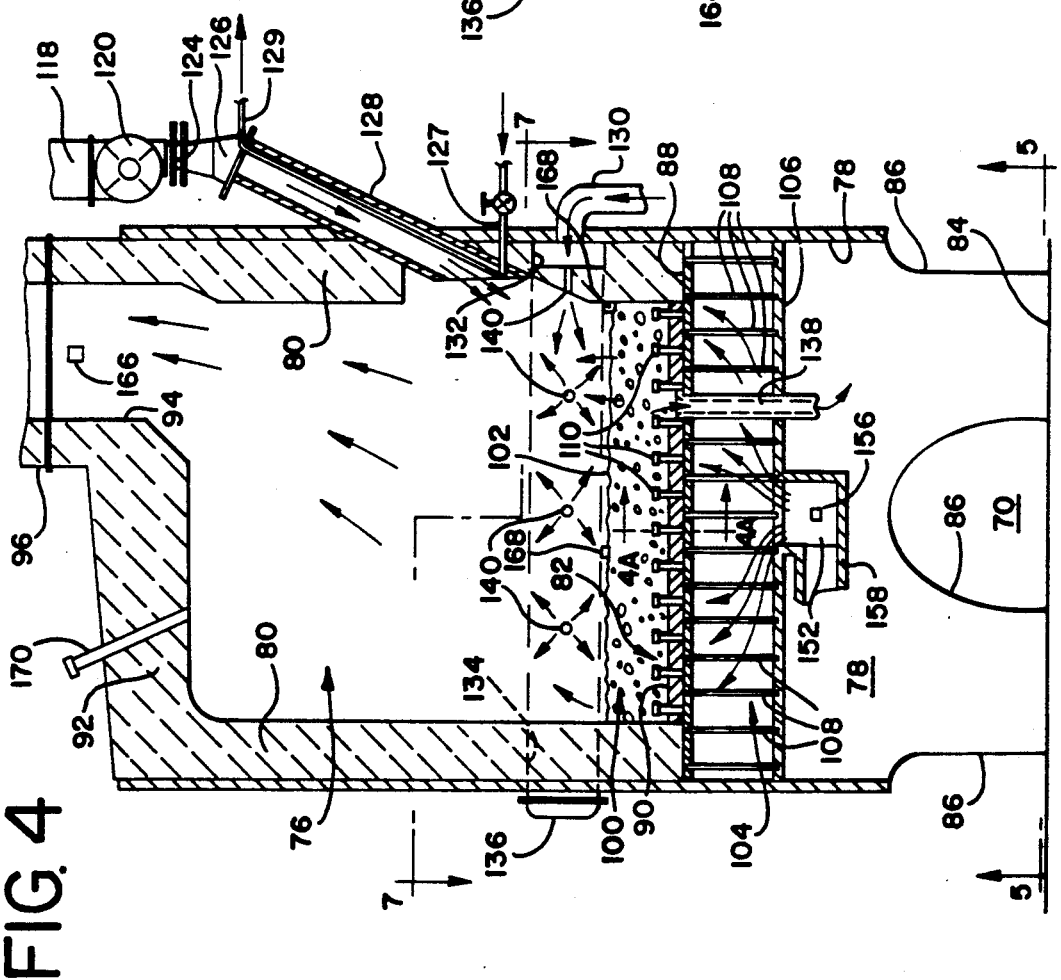
FIG. 5 is a fragmentary horizontal plan view taken substantially along line 5—5 of FIG. 4 and illustrating the underside of a combustion air supply and control system for the reburn vessel.

Referring now more particularly to FIGS. 5 and 8, a supply of combustion air for the underfire plenum chamber 104 and for the overfire, secondary air passages 140 supplied by the internal, arcuate wall plenum chamber 132 is provided by means of a relatively high pressure blower 150 driven by an electric motor 148. The blower 150 and motor 148 are mounted below the plenum chamber 104 within the open space contained within the metal shell 78 and output from the blower 150 is directed into a feed box 152 in direct communication with the plenum chamber 104 through an opening in the circular bottom wall 106 as shown in FIG. 4.

Referring momentarily to FIG. 5, output of the blower 150 may be controlled by a damper 154 so that more or less combustion air is supplied when required. An automatic damper 154 is positioned between the outlet of the blower 150 and the blower box 152 mounted on the underside of the plenum chamber 104. The automatic damper 154 is controlled by an electronic controller 156 to vary the volume of combustion air supplied by the blower 150 in response to conditions sensed in the combustion chamber 76 of the ash reburn vessel 70. The box 152 also provides a supply of overfire air to the vessel 70 via a branch duct 158 and a pair of side duct or legs 160 on opposite sides thereof, which side ducts feed into a pair of manifolds 162. The manifolds 162 supply air to four equilaterally spaced lower duct or legs 164 extending radially outwardly to supply the secondary air ducts 130. An adjustable damper 166 is provided in the branch duct 158 to apportion the air flow between underfire air supplied to the plenum chamber 104 and overfire air supplied to the secondary air passages 140.

In accordance with the present invention, a sensor 166 for sensing the temperature of the products of combustion leaving the outlet port 94 provides a control input for the electronic damper control unit 156. In addition, a plurality of equilaterally spaced apart wall pressure sensors 168 are provided at a level closely adjacent to the normal upper level 102 of the bubbling bed of burning ash material 100 to sense the height of the upper level 102 of the bed above the floor structure 82 and upper level of the refractory material 90. Inputs from the sensors 166 and 168 are used for controlling the total amount of combustion air supplied to the ash reburn vessel 70 and thus the number of control inputs are minimized so that additional operating personnel beyond those needed for the primary combustion unit 10 are not generally required. An inspection port 170 is provided in the top wall 92 of the ash reburn vessel 70 to afford a visual inspection of the combustion process.

The ash reburn vessel 70 was developed in response to a growing wood burning industry need for the reduction of ash volume and more efficient carbon burnout. Previous attempts at ash reinjection and overfire air injection systems have not yielded significantly improved results. The reburn vessel 70 of the present invention provides an external ash reburn chamber 76 which is looped in a parallel combustion path with the main or primary fuel burning unit 10. The ash reburn vessel 70 is compatible with most existing types of ash handling systems of furnaces and boilers, with only a minimum amount of conveyor system modification being required. Combustion air for the reburn vessel 70 is provided by a separate combustion air blower 150 located directly below the combustion chamber 76. The bubbling bed of burning ash material 100 provides a low velocity combustion of the fuel ash material introduced into the system and a much more complete combustion and efficient burning process takes place in comparison to traditional cinder reinjection systems.

In the past, reinjection systems have been directed mainly towards optimizing the location or level of cinder reinjection in the combustion chamber and sometimes resulted in a massive, uncontrollable burning of high volume ash material in an existing boiler front ash hopper, which usually had to be modified somewhat to accept a higher temperature. These systems are not generally efficient because of the high velocity of gas flow below the fuel distributors and oftentimes this condition made the primary combustion chamber uncontrollable. Other types of reinjection systems for more efficient operation included parallel, back-fed cells, but these cells required too much labor and needed an extensively modified and elaborate bypass system.

In the present invention, the ash material feed system supply the reburn vessel 70 is designed to feed only the relatively high percentage carbon material available as low density high volume ash from an existing dust collector system and air pre-heater supply hopper. A typical ash analysis is shown in the following table:

| TYPICAL FUEL ASH ANALYSIS #41,355 Ash Sample 03089-7-0473-01 #41,356 Ash Sample 03089-7-0473-02 | | | | |
|---|---|---|---|---|
| Analysis | #41,355 | | #41,356 | |
| Total Moisture | 63.9% | | 64.3% | |
| Density (untamped) | 9.6 #/cu ft | | 8.8 #/cu ft | |
| Density (tamped) | 13.1 #/cu ft | | 12.6 #/cu ft | |
| * Loss on Ignition | 60.5% | | 61.8% | |
| * Ash | 39.5% | | 38.2% | |
| True Carbon | 46.82% | | 47.96% | |
| Ash Fusion | Oxid | Red | Oxid | Red |
| Initial Deformation | 2125° F. | 2180° F. | 2180° F. | 2200° F. |
| Softening Temp (H = W) | 2150° F. | 2190° F. | 2200° F. | 2210° F. |
| Softening Temp (H = ½W) | 2180° F. | 2200° F. | 2250° F. | 2215° F. |
| Fluid Temp | 2200° F. | 2210° F. | 2260° F. | 2220° F. |
| BTU | 6,810 | | 6,970 | |
| Sulfur | 0.10% | | 0.06% | |

* ASTM D-1102

The following table shows the typical performance to be exhibited:

| TYPICAL PERFORMANCE DATA | | | |
|---|---|---|---|
| System Load | 50% | Boiler 100% MCR | Max Design 125% |
| 1. Char and ash flow lbs/hr | 925 | 1850 | 2400 |
| 2. Excess air leaving chamber % | 30 | 30 | 30 |
| 3. Combustion air flow lbs/hr | 6600 | 13200 | 16840 |
| 4. Combustion air supply pressure iwc | 12 | 12 | 12 |
| 5. Combustion air temperature °F. | 440 | 485 | 485 |
| 6. Flue gas flow produced lbs/hr | 7050 | 14100 | 19240 |
| 7. Flue gas temperature leaving chamber °F. | 2000 | 2000 | 2000 |

Char and ash analysis:

Loss of Ignition 60.5% by weight.
Ash 39.5% by weight, True
Carbon 46.82% by weight, HHV
6598 Btu/lb

| Ash Fusion Data | Oxidizing | Reducing |
|---|---|---|
| Initial Deformation | 2125 | 2180 |
| Softening Temp. H = W | 2150 | 2190 |
| Softening Temp. H = ½ W | 2180 | 2200 |
| Fluid Temperature | 2200 | 2210 |

In the present invention, the relatively low carbon percentage and high density, bag house type ash material is not directed to the ash reburn vessel 70 but continues to be funnelled to the plant ash disposal system 40. Similarly, high silica, low carbon grate ash continues to be collected in the boiler front hopper system and is funnelled to the plant ash disposal system 40.

The fuel ash material used in the ash reburn vessel 70 comprises a relatively high percentage carbon, low density ash material is injected into the combustion chamber 76 via the inlet chute 128 on a continuous basis through the rotary feeder valve 120 which acts as a positive chamber seal. Generally, there is no direct control of fuel ash material quantities or flow rates and the combustion chamber 76 is designed to accommodate a wide swing in fuel ash flow rates. The relatively large area of the bed 100 is designed for a relatively low gas velocity, maximum transit time and a maximum carbon burn-out. Control of the burn rate s achieved by controlling the flow of combustion air which is supplied from the blower 150, and this blower is completely separate from the combustion air supplied to the primary combustion unit air supply system of the primary combustion unit 10. The fuel bed temperature in the bubbling bed of burning ash material 100 is controlled by increasing or decreasing the quantities of air supplied in response to sensed temperature readings from the sensor 166 in the output opening 94. The total volume of air flow is split between underfire or main combustion air supplied the plenum chamber 104 and overfire or secondary air supplied to the combustion chamber 76 through the passages 140 above the upper level 102 of the bubbling bed of burning ash material 100. The ratio between underfire and overfire air can be modulated to control the emission of $NO_x$ and CO by use of the splitter damper 164. The differential pressure sensors 168 around the chamber 76 provide a means of monitoring the height of the bubbling bed of burning fuel ash material 100 and this information is also used to supply more or less combustion air to maintain an optimum bed level 102.

It should be noted that the entry port 98 from the breaching or output duct 96 of the ash reburn vessel 70 is relatively wide and spreads well across the main combustion unit wall 14. The port 98 was carefully designed to provide for low velocity and widespread or displaced entry of reburned ash material into the main unit combustion chamber 12. The low velocity entry of the products of combustion from the ash reburn vessel 70 on one side of the combustion chamber 12 minimizes gas stratification and maintains a relatively even furnace temperature profile.

When the ash reburn vessel 70 is not in use, the manual shut off gates are available to separate the components of the ash reburn system from the existing cinder reinjection and ash disposal system. These original systems are maintained substantially intact but are modified to incorporate the conveyors needed to supply the separate ash reburn vessel 70.

In addition to fuel conservation and landfill limitations because of high ash volume, ever decreasing limits on stack emissions are a major concern to the lumber and to the pulp and paper industry. $NO_x$ and CO emissions in particular need to be reviewed carefully and it has been noted that the ash reburn vessel 70 in providing a separate low velocity combustion path loop in parallel with the primary fuel combustion path, and in employing both underfire and overfire air for burning the ash material as a fuel is ideally suited for both good and efficient combustion and for emission control. The continuous feed of ash material into the combustion chamber 76 of the ash reburn vessel 70 minimizes potential problems with complicated control systems. A simple measurement of temperature and pressures as the only inputs for system control reduces the number of variables that need to be considered. The combustion air flow and the flow distribution is readily controlled with minimum operator input.

The ash reburn vessel 70 thus provides a cost effective system for conserving fuel and for minimizing the volume of ash disposal that is ultimately required. In terms of payback, the fuel saving payback is clearly a function of fuel cost and boiler capacity and the ash disposal payback or cost is a function of ash disposal volume and reburn unit capacity. The higher content of carbon in the ash material, the greater amount of fuel savings payback and similarly, the lower volume of ash that must eventually be disposed of, the lower the cost of ash disposal. The ash reburn system herein described is especially adapted for use with primary fuel systems 10 burning waste wood products, however, other types of fuels such as municipal wastes and refuse may also produce high percentage volumes of ash and the system herein described is useful in this connection.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. Apparatus for reburning ash material of a previously burned primary fuel, comprising:
 a combustion vessel having inlet means for receiving said ash material and outlet means for discharging products of combustion produced from burning said ash material;
 a floor in said vessel for supporting a discrete bubbling bed of burning ash material, said floor including a plurality of spaced apart openings; and
 combustion air injector means for introducing combustion air at a relatively low velocity into said vessel;
 said air injector means including at least one tubular injector conduit having an open upper end extending through at least one of said openings to a level above said floor and including bubble cap means over said open upper end of said conduit for directing said combustion air downwardly toward said floor for forming gas bubbles that rise upwardly in said burning bed of ash material, said air injector means further including one or more overfire air injection ports formed in a wall of said vessel for introducing combustion air at a level above said burning bed of ash material, said injection ports being aligned to direct secondary air inwardly toward a central portion of said vessel and spaced equilaterally around said wall.

2. The apparatus of claim 1, wherein:
 said openings in said floor are spaced apart substantially uniformly over the area of said floor to provide a substantially uniform distribution of combustion air into said bubbling bed of burning ash material.

3. The apparatus of claim 2, wherein:
 said air injector means includes a plenum chamber below said floor for supplying combustion air to said burning bubbling bed through said openings in said floor.

4. The apparatus of claim 1, including:
 control means for measuring the temperature of said products of combustion and the height of said bubbling bed of burning ash material for controlling the flow of combustion air supplied to said underfire injector means and said overfire injection ports.

5. The apparatus of claim 4, wherein:
 said control means includes means operative to vary the flow of said combustion air to said underfire injector means.

6. The apparatus of claim 4, wherein:
 said control means includes means for varying the amount of combustion air supplied to said vessel in response to a measured temperature level of said products of combustion.

7. The apparatus of claim 1, including:
 drain means in said floor of said vessel for reducing the level of ash material above said floor.

8. The apparatus of claim 1, including:
 sealed feeder means for directing ash material to said inlet means at a controlled rate.

9. An ash reburn system for reburning ash material of a previously burned primary fuel; comprising:
 a combustion vessel having an inlet for receiving ash material and an outlet for products of combustion produced from burning said ash material;
 floor means in said vessel for supporting a discrete bubbling bed of burning ash material and formed with a plurality of air openings spaced apart and distributed substantially uniformly throughout the area of said bubbling bed;
 combustion air supply means for providing underfire air for introduction through said openings of said floor means and for providing overfire air above the level of said bubbling bed of burning ash material; and
 control means sensitive to the temperature of said products of combustion and the height of said discrete bubbling bed of burning ash material above said floor means for controlling said combustion air supply means.

10. The ash reburn system of claim 9, wherein:

said underfire air is introduced into said bubbling bed through a plurality of bubble cap assemblies, mounted in respective openings of said floor means; and each said bubble cap assembly including a central fluid conduit mounted in one of said floor openings with an open upper end above said floor means and a bubble cap above said upper end of said conduit for directing a flow of combustion air downwardly toward said floor means thereby forming gas bubbles that rise upwardly in said discrete bubbling bed of burning ash material.

11. The ash reburn system of claim 9, wherein:

said overfire air is introduced into said vessel from a plurality of inwardly directed injection passages spaced around a periphery of said vessel.

12. The ash reburn system of claim 9, wherein:

said combustion air supply means includes blower means supplying air to plenum chamber means below said floor means for said supplying said underfire air.

13. The ash reburn system of claim 12, wherein:

said combustion air supply means includes duct means supplied with air from said blower means for supplying said overfire air to said injection passages.

14. The ash reburn system of claim 13, wherein:

said control means includes controllable air gate means for controlling the proportion of air supplied from said blower means directed to said plenum chamber means on the one hand and directed to said duct means on the other hand.

15. The ash reburn system of claim 12, wherein:

said control means includes means for controlling the air supplied by said blower means in response to sensed conditions of temperature of said products of combustion and of height of said discrete bubbling bed above said floor means.

16. The ash reburn system of claim 9, in combination with:

a primary fuel combustion unit having combustion chamber means for firing said primary fuel and ash collection means for separating out said ash material from products of combustion generated in said combustion chamber;

conveyor means between said collection means of said primary combustion unit and said inlet of said combustion vessel of said ash reburn system for directing a flow of said ash material to be reburned into said vessel; and duct means between said outlet of said combustion vessel of said reburn system and said combustion chamber means of said primary fuel combustion unit for directing a flow of said products of combustion generated in said combustion vessel into said combustion chamber means of said primary fuel combustion unit.

17. The combination of claim 16, wherein:

said combustion chamber means of said primary fuel combustion unit is fired at a lower level and includes upwardly extending wall means above said lower level, and wherein:

said duct means is connected to said wall means at a level around said lower level of firing in said combustion chamber means.

18. The combination of claim 17, including:

sealed feeding means in said conveyor means between adjacent said inlet of said combustion vessel for preventing a back flow of products of combustion of said burning ash material from said combustion vessel into said collection means of said primary fuel combustion unit.

* * * * *